(12) United States Patent
Gossling

(10) Patent No.: US 9,327,184 B2
(45) Date of Patent: May 3, 2016

(54) APPARATUS AND METHOD OF MANIPULATING NUMERIC PANELS

(76) Inventor: Nancy Gossling, Toronto (CA)

( * ) Notice: Subject to any disclaimer, the term of this patent is extended or adjusted under 35 U.S.C. 154(b) by 723 days.

(21) Appl. No.: 13/340,203

(22) Filed: Dec. 29, 2011

(65) Prior Publication Data

US 2013/0137070 A1    May 30, 2013

(30) Foreign Application Priority Data

Nov. 25, 2011 (CA) .................................. 2759553

(51) Int. Cl.
| A63F 9/00 | (2006.01) |
| G09B 1/00 | (2006.01) |
| G09B 1/32 | (2006.01) |
| G09B 19/02 | (2006.01) |
| A63F 3/04 | (2006.01) |

(52) U.S. Cl.
CPC .............. *A63F 3/0415* (2013.01); *A63F 9/0098* (2013.01); *G09B 19/02* (2013.01); *A63F 2250/1068* (2013.01)

(58) Field of Classification Search
CPC ........... A63F 3/0457; A63F 2001/0416; A63F 2001/0425
USPC .......... 434/302, 129, 188, 191, 209; 273/242, 273/243, 272, 299, 430
See application file for complete search history.

(56) References Cited

U.S. PATENT DOCUMENTS

| 5,176,381 | A  | * | 1/1993 | Winters | ........................ 273/146 |
| 5,688,126 | A  | * | 11/1997 | Merritt | .......................... 434/128 |
| 5,868,393 | A  | * | 2/1999 | Williams | ...................... 273/299 |
| 6,341,779 | B1 | * | 1/2002 | Merritt | .......................... 273/292 |
| 7,220,126 | B2 | * | 5/2007 | Glymph | ........................ 434/191 |
| 7,273,375 | B2 | * | 9/2007 | Wolf et al. | .................... 434/188 |

* cited by examiner

Primary Examiner — Sam Yao
Assistant Examiner — Peter J Alley
(74) Attorney, Agent, or Firm — Snell & Wilmer LLP (57) ABSTRACT

An apparatus and method of manipulating numeric panels according to an evaluation of a division operation using a division token is provided. At step (1) of the method, a method participant uses a mathematical operator token to randomly select a mathematical operator from a plurality of mathematical operators one of which being a division operator. At step (2) of the method, upon the selected mathematical operator comprising the division operator, the method participant randomly selects a division operation from a plurality of predefined division operations using a division token and evaluating the selected division operation, the division token comprising a plurality of division indicia each associated with one of the predefined division operations, each of the division operations evaluating solely to an integer quotient. At step (3) of the method, the method participant manipulates a subset of available panels from an array of numeric panels.

20 Claims, 3 Drawing Sheets

APPARATUS AND METHOD OF MANIPULATING NUMERIC PANELS

CROSS-REFERENCE TO RELATED APPLICATION

The present application claims the benefit and priority from Canadian Patent Application Serial No. 2,759,553, file on Nov. 25, 2011, the entire disclosure of which is incorporated herein by reference.

FIELD OF THE INVENTION

This patent application relates to an apparatus and method for an arithmetic game and, in particular, to a method of manipulating numeric panels according to an evaluation of addition, subtraction, multiplication and division operations.

BACKGROUND

In the teaching of mathematics, especially to children, tactile teaching aids may be employed to assist learning. In particular, a teaching aid that promotes learning without resembling work or study is desirable as some individuals may experience difficulty focusing on studious activities for prolonged periods.

One type of mathematical teaching aid includes the use of one or two six-sided dice and a set of sequentially numbered tiles from 1 to 9. As the dice are rolled, the user is directed to flip over or cover any of the tiles according to the numbers appearing on the rolled dice. This can be achieved by covering tiles equal to the rolled numbers or by covering tiles having numbers that together sum together to equal the sum total of the rolled numbers. For example, when rolling a 5 and 6, the user may choose to cover tiles 5 and 6; 9 and 2; 8, 2, and 1; 5, 3, 2, and 1, or any other combination of tiles totaling 11. The user is directed to continue rolling dice and flipping tiles until either no tiles remain face up, or until the dice are rolled and insufficient tiles remain for flipping corresponding to the sum total of the rolled numbers. By attempting to determine the optimal tiles to flip, a user, perhaps unknowingly, may develop or practice basic mathematical and problem solving skills.

There is a need for an apparatus or method that includes more advanced mathematical operations including subtraction, multiplication and division; There is a further need for such an apparatus or method that also includes a random function whereby the mathematical operation can be chosen in order add an element of strategy.

SUMMARY

As described in this patent application, in accordance with an aspect of the present invention there is provided a method involving at step (1) a method participant using a mathematical operator token to randomly select a mathematical operator from a plurality of mathematical operators. The mathematical operator token may comprise a plurality of operator indicia each associated with one of the plurality of mathematical operators. One of the mathematical operators of the plurality of mathematical operators comprises a division operator.

At step (2) of the method, upon the selected mathematical operator comprising the division operator, the method participant randomly selects a division operation from a plurality of predefined division operations using a division token and evaluating the selected division operation, the division token comprising a plurality of division indicia each associated with one of the predefined division operations, each of the division operations evaluating solely to an integer quotient. The method participant otherwise randomly selects at least one numerical operand from a plurality of numerical operands using at least one numerical token and evaluates the selected mathematical operation with the selected at least one numerical operand, each said numerical token comprising a plurality of numerical indicia each associated with one of the plurality of numerical operands.

At step (3) of the method, the method participant manipulates a subset of available panels from an array of numeric panels, each panel of the array of numeric panels including a numeric indicia associated with a numeric value, a sum of the numeric values of the manipulated subset of panels being equal to an outcome of the evaluating. Otherwise the manipulated subset of panels comprises none of the panels of the array of numeric panels. The manipulated subset of panels is subsequently unavailable for manipulating by the method participant.

At step (4) of the method, repeating steps (1) through (3) until a pre-defined termination state is achieved.

In accordance with another aspect of the present invention, there is provided an apparatus comprising: an array of numeric panels, each including a numeric indicia associated with a numeric value; at least one numerical token, each comprising a plurality of numerical indicia each associated with one of a plurality of numerical operands; a mathematical operator token comprising a plurality of operator indicia each associated with one of a plurality of mathematical operators, one of the mathematical operators of the plurality of mathematical operators comprising a division operator; a division token comprising a plurality of division indicia each associated with one of a plurality of predefined division operations, each of the division operations evaluating solely to an integer quotient; and a set of instructions defining a method for manipulating the numeric panels. The method comprises: (1) a method participant using the mathematical operator token to randomly select one of the mathematical operators from the plurality of mathematical operators; (2) upon the selected mathematical operator comprising the division operator, the method participant randomly selecting one of the division operations from the plurality of predefined division operations using the division token and evaluating the selected division operation, the method participant otherwise randomly selecting at least one of the numerical operands from the plurality of numerical operands using the at least one numerical token and evaluating the selected mathematical operation with the selected at least one numerical operand; (3) the method participant manipulating a subset of available panels from the array of numeric panels, a sum of the numeric values of the manipulated subset of panels being equal to an outcome of the evaluating, otherwise the manipulated subset of panels comprising no panels of the array of numeric panels, the manipulated subset of panels being subsequently unavailable for manipulating by the method participant; and (4) repeating steps (1) through (3) until a pre-defined termination state is achieved.

BRIEF DESCRIPTION OF THE DRAWINGS

The method and kit will now be described, by way of example, with reference to the accompanying drawings, in which.

DETAILED DESCRIPTION

Figure 1:
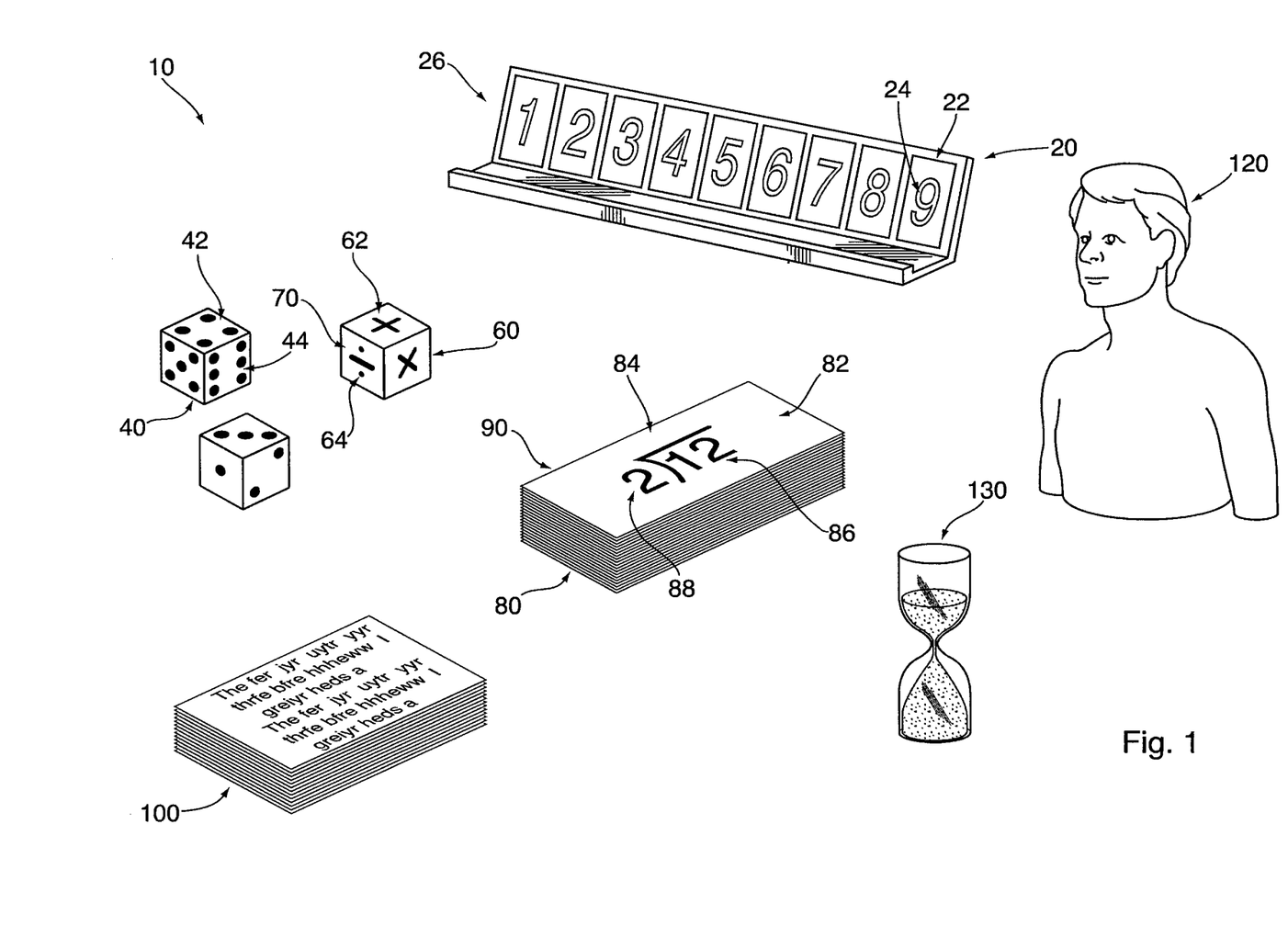
FIG. 1 is a perspective view of the apparatus of the present invention.

An embodiment of the present invention will be described with reference to the accompanying figures. In FIG. 1, there is shown an embodiment of an apparatus 10 according to the present invention. Although the apparatus 10 is shown with its various component parts, the apparatus 10 may be presented in a bag, box, or other container (not shown) but must be removed from any container for manipulating. The apparatus 10 comprises one or more arrays 20 of numeric panels 22, at least one numerical token 40, a mathematical operator token 60, a division token 80, and a set of instructions 100.

Figure 2:
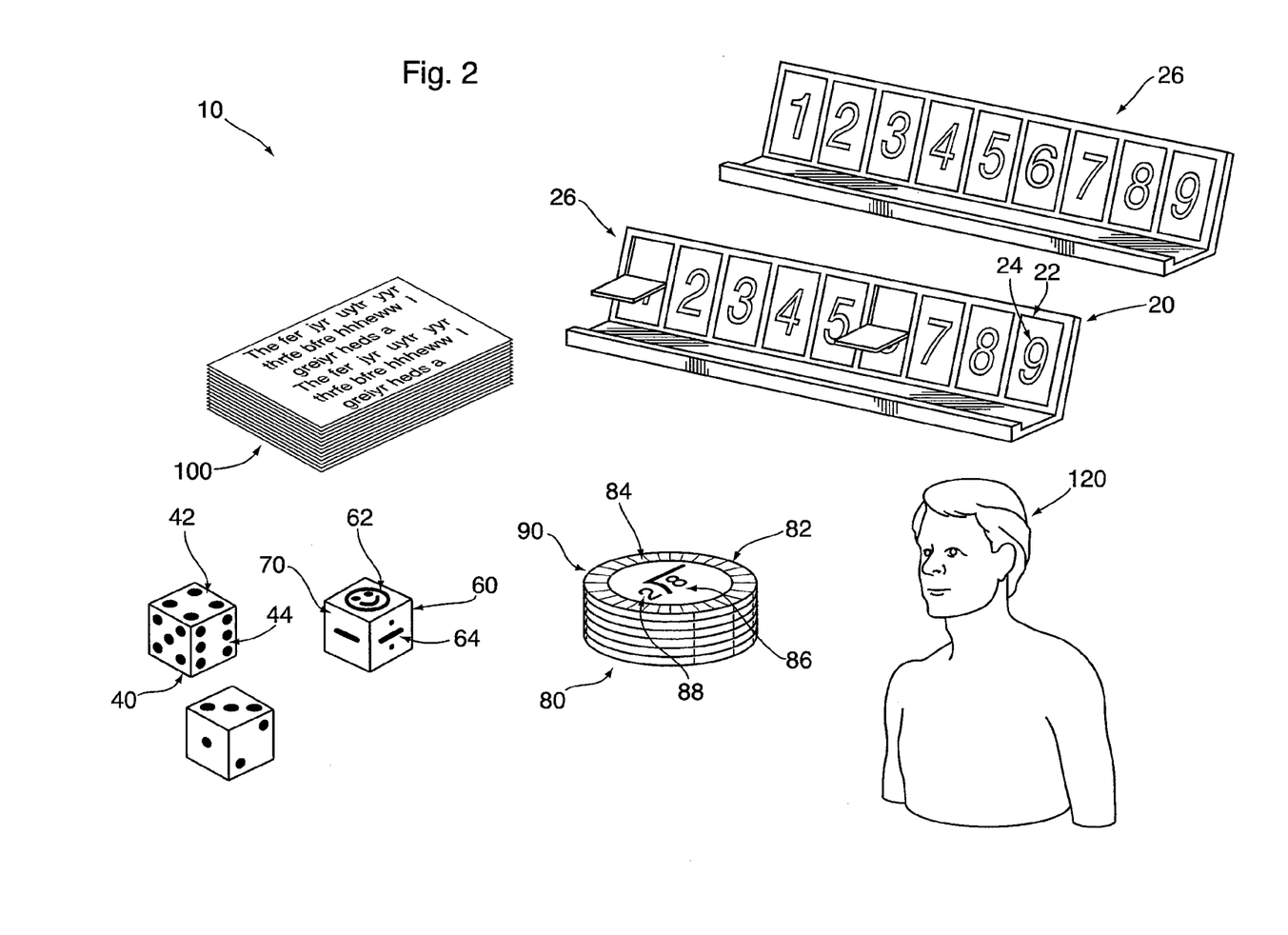
FIG. 2 is a perspective view of another embodiment of the apparatus of the present invention.

Each one of the array 20 of numeric panels 22 may include a numeric indicia 24 associated with a numeric value. In one implementation the array 20 includes numeric panels 22 having numeric indicia 24 ranging from numeric values one to nine. In another implementation, the array 20 includes numeric panels 22 having numeric indicia 24 ranging from numeric values one to twelve. In yet another implementation, the array 20 includes a plurality of rows of numeric panels 22, each row of panels 22 having numeric indicia 24 ranging from numeric values one to nine, one to twelve, or other any sequential numeric range. Preferably, there are two rows numeric panels 22, as shown in FIG. 2. In other embodiments, there are three, four or more numeric panels 22. The panels 22 are preferably arranged sequentially by numeric value on a table top or in a panel holder 26. In one implementation the panels 22 may be cards made of paper, plastic, or other material. In another implementation the panels 22 may be block tiles made of metal, wood or other fibrous material. Each numeric indicia 24 may be carved, painted, drawn, or adhered to the respective panel 22. The panel holder 26 may retain each panel 22 in a first position where the panel 22 is partially upright or substantially upright as shown in FIG. 1. Each panel 22 may be independently manipulated to move between the first position to a second position where the numeric indicia 24 is obscured from view. In one implementation, the second position may be where the panel 22 is facing down so that the numeric indicia 24 is facing down towards the panel holder 26 or other surface.

The at least one numerical token 40 may comprise a plurality of numerical indicia 42. Each numerical indicia 42 may be associated with one of a plurality of numerical operands. In a preferred implementation, each numerical token 40 may comprise a numeric die. Each numeric die may comprise a number of numeric die sides 44 including four, six, twelve, twenty, twenty-four, thirty, thirty-two sides, or any number of sides arranged to allow the numeric die to be rolled and complete a roll showing only one numeric die side 44 in a position that the one numeric die side 44 has been selected. Each numeric die side 44 has thereon an indication of one of the plurality of numerical indicia 42. Preferably, the range of numeric indicia 42 includes the numbers from one to the number of die sides 44 of the numerical token 40. For example, where the numeric die has twelve sides, the die sides 44 have numerical indicia 42 ranging in numeric value from one to twelve. Preferably, each numeric value is only represented once per numeric die.

The operator token 60 comprises a plurality of operator indicia 62. Each operator indicia 62 may be associated with one of a plurality of mathematical operators. One of the mathematical operators of the plurality of mathematical operators comprising a division operator 64, whereby the operator indicia 62 associated with the division operator 64 is an indication of the division operator. Other than the indication of the division operator 64, other mathematical operators associated with the operator indicia 62 may include an addition operator, a subtraction operator, and a multiplication operator. The operator token 60 preferably also includes a wild or random mathematical operator indicia which represents that one of the mathematical operators of addition, subtraction, multiplication or division may be selected at the discretion of a method participant. An example of the operator token 60 with a wild operator indicia 62 may be seen in FIG. 2.

The operator token 60 may be in the form of a die, a wheel, or any other tangible token having a plurality of operator token surfaces 70. One of the plurality of operator indicia 62 may be represented on each one of the operator token surfaces 70.

In one implementation, the operator token 60 may be an operator die. The operator die may have four, six, or greater than six operator token surfaces 70, each surface 70 corresponding to a side of the operator die. In this case, rolling the operator token 60 along a table top or other surface would allow for an operator token roll outcome of the arithmetic operation operator indicated on the top-most surface 70 upon completion of the roll of the operator token 60. It is this top-most surface 70 upon completion of the roll of the operator token 60 that may be identified as the selected top surface 70, and the operator indicia 62 shown on that top-most surface 70 shall be the selected operator. Where there are more than four operator token surfaces 70, each arithmetic operation operator may be indicated on more than one of the operator token surfaces 70. By providing an unequal number of like-indications, the probabilities of rolling particular arithmetic operation operators may be unequal.

In another implementation, the operator token 60 may be an operator wheel. The operator wheel may have four, six, or greater than six operator token surfaces 70, each surface 70 being separated from other surfaces 70 by a marked line, beveled line, or other feature. Preferably, the wheel has an axis of rotation perpendicular to a centre point of the wheel such that the wheel may be rotated about the axis and each of the operator token surfaces 70 indicating an arithmetic operation operator are visible from one direction. An arrow or other pointer may be disposed on or near the wheel to point at one of the token surfaces 70. In this case, the operator token roll outcome is the arithmetic operation operator indicated by the one operator token surface 70 pointed to by the arrow after a spin of the wheel or the arrow. Spinning the wheel or the arrow will cause the arrow to travel across each one of the operator token surfaces 70, eventually residing still pointing at one token surface 70 indicating the operator roll outcome.

The division token 80 comprises a plurality of division indicia 82. Each division indicia 82 may be associated with one of a plurality of predefined division operations 84. Each of the division operations 84 may be evaluated solely to an integer quotient (not shown).

In a preferred implementation the division token 80 may take the form of a set of cards. As shown in FIG. 1, each card 90 may have a front face having one division indicia 82 associated with one of a plurality of predefined division operations 84. Each card 90 may further have a rear face having another division indicia 82 associated with one of a plurality of predefined division operations 84. The division indicia 82 may be represented as a division operation having an integer dividend divided 86 by an integer divisor 88. The corresponding integer quotient for the division indicia 82 may be indicated on the same face or an opposite face of the card 90, or on a separate card 90 in the set of cards. Alternatively, the integer quotient may not be indicated anywhere on the token. In either case, should the division operation 84 of a card 90 be evaluated, the evaluation result shall be an integer quotient without any remainder for reasons set out during the subsequent discussion of the set of instructions 100.

In another implementation, the division token 80 may take the form of a set of chips or coins, as shown in FIG. 2. Each chip may have a front face having one division indicia 82 associated with one of a plurality of predefined division operations 84. Each chip may further have a rear face having another division indicia 82 associated with one of a plurality of predefined division operations 84. The division indicia 82 may be represented as a division operation having an integer dividend 86 divided by an integer divisor 88. The corresponding integer quotient for the division indicia 82 may be indicated on the same face or an opposite face of the chip, or on a separate chip in the set of chips. Alternatively, the integer quotient may not be indicated anywhere on the token. In either case, should the division operation 84 of a card 90 be evaluated, the evaluation result shall be an integer quotient without any remainder for reasons set out during the subsequent discussion of the set of instructions 100.

Figure 3:
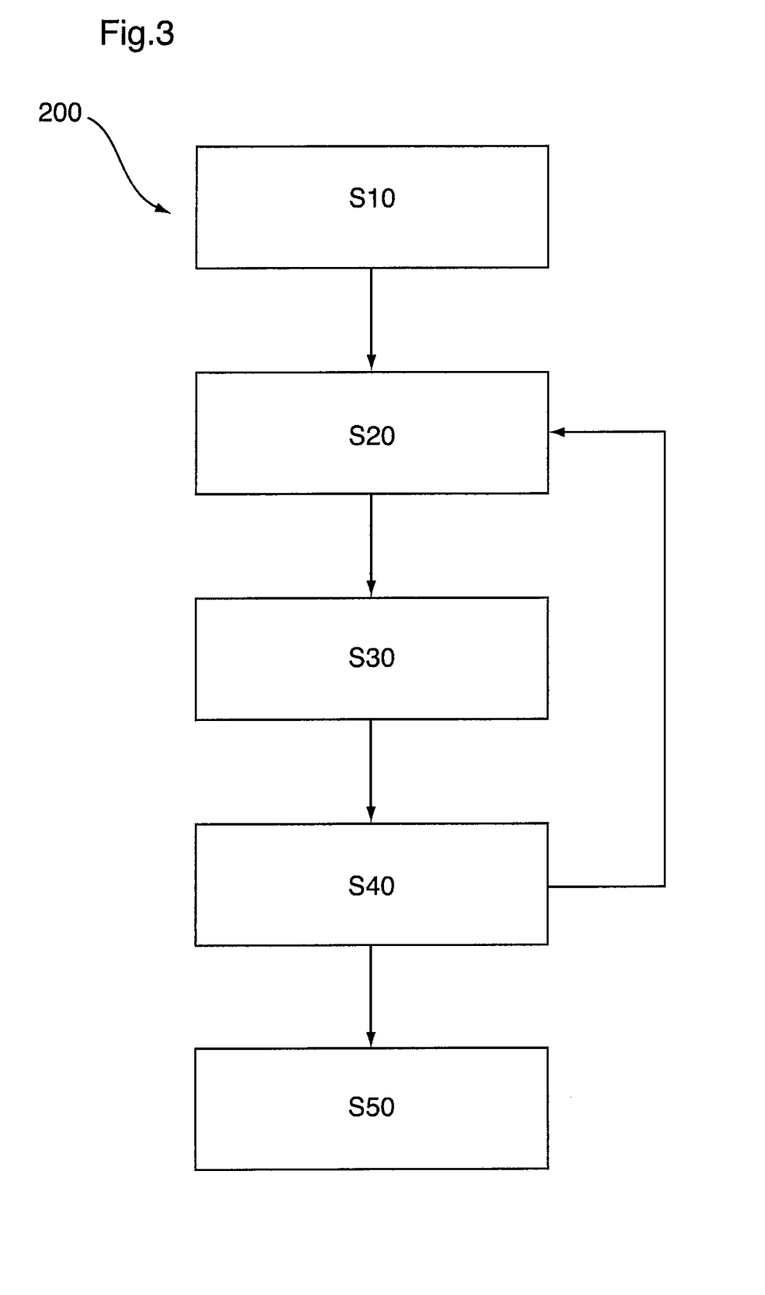
FIG. 3 is a flow chart that depicts the steps of the method in accordance with the present invention.

The instructions 100 define a method 200, shown in FIG. 3, for manipulating the numeric panels 22, the method 200 including pre-defined rules or steps for playing a mathematical game using each of the components of the apparatus 10. Through performing the steps, a method participant 120 may develop or practice mathematical or problem solving skills. Preferably, a method participant 120 means an individual person carrying out the steps of the method.

At a first step S10, the instructions 100 direct the method participant 120 to use the mathematical operator token 60 to randomly select one of the mathematical operators from the plurality of mathematical operators. As previously stated, preferably this may be accomplished by rolling the operator token 60 where the token 60 is a die. By rolling the die, the selected mathematical operator may be indicated by the operator indicia 62 on the token surface 70 facing substantially upwards after the die roll is complete.

At a second step S20, where the selected mathematical operator is the division operator 64, the instructions 100 direct the method participant 120 to randomly select one of the division operations 84 from the plurality of predefined division operations 84 using the division token 80 and evaluating the selected division operation. In the implementation where the mathematical operator token 60 is an operator die, the selecting of the mathematical operator is achieved by rolling the operator die. The operator indicated on the top most operator token surface 70 of the operator die upon completing the operator die roll is the mathematical operator selected. In the implementation where the mathematical operator token 60 is an operator wheel, the selected of the mathematical operator is achieved by spinning the wheel, or an indicator attached thereto. The operator indicated on the mathematical operator token surface 70 pointed to by the attached indicator is the mathematical operator selected.

In a preferred implementation where the division token 80 is a set of cards, the set of cards may be arranged in a stack as shown in FIG. 1. The method participant 120 may select a card 90 from the top of the stack such that the division operation 84 shown thereon is selected from amongst the division operations 84 shown on all the other cards 90 in the set of cards. In the implementation where the division token 80 is a set of chips or coins, the chips may be collected in a bag, box, or other container, or simply deposited on a surface such as a tabletop surface. The method participant 120 may select one of the chips such that the division operation 84 shown thereon is selected. In any implementation, the method participant 120 may review the selected division operation 84 and evaluate it by dividing the dividend 86 by the divisor 88 of the selected division operation 84.

Where the selected mathematical operator is not the division operator 64, the method participant 120 may randomly select at least one of the numerical operands from the plurality of numerical operands using the at least one numerical token 40 and evaluating the selected mathematical operation with the selected at least one numerical operand. In the implementation described above, where the numerical token 40 is a numeric die, the numeric die may be rolled. The numerical value of the numerical indicia 42 indicated on the top most numeric die side 44 upon completing the numeric die roll is the numeric operand selected. In a preferred implementation, two numeric operands are selected by the method participant 120 by rolling numeric dice. There may be one numeric die rolled twice, each numeric dice roll selecting one numerical operand. Alternatively, there may be two numeric dice, each rolled once, each roll electing one numerical operand. There may be other implementations requiring more than two operands, in which case more than two numeric dice may be provided for rolling, or one or more of the numeric dice may be rolled multiple times. In another implementation, as with the mathematical operator token 60, each numerical token 40 may be a numerical wheel that is spun to select numerical operands from numerical indicia 42 shown thereon. The wheel may be spun multiple times to select multiple numerical operands, or multiple wheels may be provided. Once the numerical operands are selected, the method participant may review the selected mathematical operation comprising the selected numerical operands and the selected mathematical operator and evaluate it applying the selected mathematical operator to the selected numerical operands.

At a third step S30, the instructions 100 direct the method participant 120 to manipulate a subset of available panels from the array of numeric panels 22, the manipulated subset of panels being subsequently unavailable for manipulating by the method participant 120. The subset of available panels is a selection of numeric panels that may correspond to all available panels, none of the available panels, or some of the available panels. A method participant 120 transitions a numeric panel 22 from an available state, or first position, to an unavailable state, or second position by manipulating the numeric panel 22. In an implementation where the numeric panel 22 is not fixed to any other object, the method participant 120 may manipulate the numeric panel 22 by overturning the panel 22 such that the numeric indicia 24 shown thereon is hidden or obscured from view. In another implementation the manipulation may comprise the method participant 120 displacing the panel 22 from a first location to a second location, such that panels 22 that are available are located at the first location, while panels 22 that are unavailable are located at the second location. In another implementation, where the numeric panels 22 rest upon a panel holder 26, the manipulation may comprise the method participant 120 sliding, pivoting, rotating, or moving the panel 22 with respect to the panel holder 26 to indicate that the panel 22 is unavailable for future manipulating. In another implementation the manipulation may comprise the method participant 120 identifying unavailable numeric panels 22 by recording the numeric value indicated on the unavailable numeric panels 22 on a recordable medium. For example, when the numeric panel 22 having the numeric value five indicated thereon is manipulated to be unavailable, the method participant 120 may write the numeric value five on a piece of paper to indicate that the respective numeric panel 120 is now unavailable for further manipulation.

The method participant 120 determines which panels 22 form part of the subset of available panels such that a sum of the numeric values of the manipulated subset of panels is equal to the outcome of the evaluating done at step S20. For example, where the outcome of the evaluating is the numeric value forty, then the method participant is directed to select a subset of panels 22 having numeric indicia 24 that sum together to equal the numeric value forty. There may be several subsets of the array panels 22 that meet this criteria. The method participant 120 shall select one of these subsets of panels, and manipulate each of the panels 22 of the subset to make the panels 22 unavailable. If there is no subset of available panels 22 having a sum of numeric values equal to the outcome of the evaluating done at step S20, then the method participant 120 shall not manipulate any panels 22 at step S30.

At a fourth step S40, the set of instructions 100 direct the method participant 120 to repeat steps S10 through S30 until a pre-defined termination state S50 is achieved.

In one implementation, the pre-defined termination state comprises all of the numeric panels being unavailable for the manipulating. This may be achieved where every panel 22 of the array 20 of numeric panels 22 has already been manipulated by the method participant 120 from the available state to the unavailable state. This pre-defined termination state is representative of the method participant 120 completing one instance of the method. If this pre-defined termination state is achieved, the method participant 120 has successfully completed the game.

In another implementation, the pre-defined termination state comprises the manipulated subset of panels being none of the panels of the array of numeric panels. As previously described, where no panels 22 are manipulated at step S30 due to there being no subset of available panels 22 having a sum of numeric values equal to the outcome of the evaluating done at step S20, then the method ceases. If this pre-defined termination state is achieved, the method participant 120 has unsuccessfully completed the game as panels 22 remain available but could not be manipulated based on directions provided for step S30. Accordingly, as a way to develop or practice mathematical and problem solving skills, it is up to the method participant 120 to determine the optimal subset of available panels 22 at each instance of step S30. At each step S30, there may be particular subsets of panels 22 that are more likely to allow for the method participant 120 to successfully complete the game than other subsets of panels 22. By performing multiple summations of numeric values at step S30 of various subsets of panels 22, the method participant 120 may be performing one or more mathematical and logic equations. For example, by selecting a particular subset of panels 22, the method participant 120 may be considering which panels 22 would remain after step S30, and the probabilities of being able to manipulate those remaining panels subsequently. The method participant 120 may be evaluating and ranking a plurality of possible subsets in order to determine the optimal strategy, without necessarily realizing that the mathematical skills of the method participant 120 may be being developed.

In one implementation, the numerical token 40 may comprise two sets of two dice (four dice in all), where each die may preferably comprise six sides. Preferably each side has thereon an indication of a number from one to six, unique amongst the other sides of the same die. One of the two sets of dice may be rolled and the outcome of the two die may be added to determine one operand. The other of the two sets of dice may also be rolled, the outcome of these two dice may also be added to determine another operand. These two operands may be evaluated together with the selected mathematical operator at step S20 in order to manipulate a subset of available panels from the array of numeric panels 22 at step S30. Since the dice roll outcomes of two six-sided die are added together, the maximum result of rolling one of the sets of two dice would be by rolling the dice face indicating the number six on each die, adding to twelve. Where the outcome of selecting a mathematical operator is the multiplication operator, the method participant would be required to multiply using the twelve times table. It can be seen that by using die with a greater or lesser number of numeric sides, different maximum times tables may be possible. For example, for more advanced players, two sets of two dice each die comprising twelve sides may be employed in order to practice multiplication up to the twenty-four times table.

In a preferred implementation, the array 20 of numeric panels 22 may comprise two rows of panels 22, each row comprising panels 22 having thereon indications of the numbers one to nine. Preferably, the panels 22 would be arranged in increasing numerical order from one to nine. The rows 22 may be arranged one in front of the other such that the panel 22 having the number one in the front row is aligned in front of the panel 22 having the number one in the back row. During the manipulating step S30, the method participant may be instructed to manipulate a panel 22 in the front row prior to manipulating the like-numbered panel 22 in the rear row. Optionally, the method participant may be instructed to manipulate only one like-numbered panel 22 per step S30. For example, should the method participant manipulate the front row panel 22 having thereon the number two, the method participant may not be permitted to manipulate the rear row panel 22 having thereon the number two until a subsequent instance of step S30. This variant may introduce additional strategy or probability considerations for the method participant to consider upon deciding which panels 22 to manipulate at each step S30. For example, it may not be desirable to have manipulated all panels 22 except for two like-numbered panels 22 as only one of those like-numbered panels 22 may be manipulated upon each remaining instance of step S30. There would be a high probability of being unable to manipulate each of those remaining panels 22 upon subsequent instances of step S30, thereby satisfying a predefined termination state prior to completely knocking down, or manipulating all of the panels 22. As a more desirable pre-defined termination state is when the method, or game, has ended as a result of all panels 22 being manipulated, the method participant may decide to carefully consider the consequences of manipulating particular panels 22, thereby solving additional arithmetic and logic, and further developing, practicing such skills.

Alternatively, the method participant may be instructed to manipulate panels 22 only in one row at each instance of step S30. For example, at each instance of step S30 the method participant may be permitted to manipulate only panels 22 in the front row, or panels 22 in the rear row, but not both. Each of these variants may introduce additional strategy and probability considerations for the method participant to consider upon deciding which panels 22 to manipulate at each step S30.

Where the mathematical operator selected at step S20 is addition, the evaluating of the selected numerical operands may comprise adding together the numerical operands. Where the mathematical operator selected at step S20 is subtraction, the evaluating of the selected numerical operands may comprise subtracting one numerical operand from the other numerical operand. In one implementation, the method participant shall be permitted only to subtract the smaller numerical operand from the larger numerical operand. In another implementation, the method participant may be permitted to subtract either numerical operand from the other numerical operand. In the event that the evaluation result is less than the number zero, the method participant may be permitted to treat the evaluation result as a positive number. For example, should the method participant subtract the number seven from the number five, the result would be negative two. In this case, the method participant may be permitted to treat the evaluation result as the positive number two instead. Where the mathematical operator selected at step S20 is multiplication, the evaluation of the selected numerical operands may comprise multiplying one numerical operand by the other numerical operand. In any of these cases, the resulting number from the evaluation is the number the method participant may use at step S30 to determine which of the numeric panels 22 to manipulate.

In one implementation, the method may comprise manipulating none of the panels of the array of numeric panels when the outcome of the evaluating is incorrect. As a method participant 120 may be carrying out the steps of the method in order to develop mathematical or problem solving skills, the method participant 120 may not always accomplish the evaluation at step S20 correctly. Especially where the selected mathematical operator is the division operator 64, the method participant 120 may experience difficulty solving the selected division operation on a first attempt. In order to encourage learning by the method participant 120, it is helpful that the method participant 120 experience some consequences to failing to evaluate the division operation correctly. In this implementation, when the method participant 120 evaluates the mathematical operation incorrectly, division or otherwise, the method participant 120 is instructed not to manipulate any panels 22. Instead, the method participant 120 shall repeat steps S10 and S20 until the selected mathematical operation is evaluated correctly, before proceeding to manipulate the subset of available panels at step S30.

In another implementation, the apparatus 10 may further comprise a timer 130 and the method further comprises each of a plurality of method participants 120 performing steps S10 through S40 before expiry of the timer 130. Upon expiry of the timer, the method participants 120 may determine a winning one of the method participants 120 from sums of the numeric values of the panels 22 not manipulated. In this implementation, there are multiple method participants 120, or players. The method participants 120 may each compete to determine which of the method participants 120 is the most successful in manipulating the array 20 of panels 22 prior to expiry of a pre-determined time period set by initializing the timer 130. As soon as the timer 130 expires, the method, or game, ends. Each method participant 120 sums the total of the numeric values of the panels 22 not manipulated to determine the score achieved by each method participant 120. The method participant 120 with the lowest sum total score is the winner. Where more than one method participant 120 achieves the lowest sum total score, then either both of those method participants 120 are the winners or those method participants 120 may repeat the method as a playoff to determine a winner in a similar manner. The method participants 120 may each be provided with an apparatus 10, also known as a game board, or the method participants 120 may alternate use of the apparatus 10. Where each method participant 120 is provided with an apparatus 10, the method participants 120 may perform the method of the present invention simultaneously in order to provide motivation to the method participants 120 to perform the method steps quickly and correctly, thereby training mathematical and problem solving skills of the method participants 120. Multiple method participants 120, or players, may take turns performing the method steps on the apparatus 10, also known more colloquially as taking turns playing on one game board. When one method participant 120 reaches one of the predetermined termination states, then the apparatus 10 may be reset and another method participant 120 may perform the method steps using the same apparatus 10.

In another implementation, the method further comprises each of a plurality of method participants performing steps S10 through S40, wherein once the predefined termination state S50 is achieved, making available for manipulating each unavailable panel, each of the method participants repeatedly performing steps S10 through S40 until sums of the numeric values of the panels not manipulated by one of the method participants exceeding a pre-determined maximum value. In this implementation, a pre-determined maximum value may be set prior to commencement of the method. Each time each method participant 120 reached the predefined termination state S50, the sum total of the numeric values of the panels not manipulated is determined. If the sum total achieved is greater than a pre-determined maximum value, such as the value fifty, then the method participant 120 achieving that sum total has lost. Where a plurality of method participants 120 are performing the method steps, then whenever a method participant 120 has lost, that method participant 120 may no longer perform the method. The remaining method participants 120 may continue to perform the method until there remains only one method participant 120 who has not lost. That method participant 120 shall be the winner. In order to provide motivation to the method participants 120, the pre-determined maximum value may be reduced after each predefined termination state S50 such that later rounds of the method require more optimal selection of the subset of panels 22 at step S30 in order to not lose.

In yet another implementation, one of the operator indicia 62 may comprise a wild operator (not shown), and method step S10 comprises the method participant 120 selecting one of the plurality of mathematical operators upon the selected mathematical operator comprising the wild operator. Where the mathematical operator token 60 is a numeric die or wheel, operator indicia 62 indicating the wild operator may be provided on at least one operator token surface 70. Preferably, where the operator token 60 is a six-sided numeric die, there is shown an operator indicia 62 on each of the six operator token surfaces 70 of the numeric die such that two division operators 64 are indicated on opposing surfaces 70, two multiplication operators are indicated on opposing surfaces; two addition operators are indicated on opposing surfaces, two subtraction operators are indicated on opposing surfaces, and two wild operators are indicated on opposing surfaces. Where the wild operator is selected, the method participant 120 may select one of the other mathematical operators preferred by the method participant 120 before proceeding to step S20. The choice of mathematical operator introduces elements of strategy to the method. Prior to selecting the mathematical operator, the method participant 120 may now attempt to evaluate the mathematical operation using each of addition, subtraction or multiplication to consider the optimal panels 22 to be manipulated in each case at step S30. Should the method participant decide that none of these options produce desirable panel-manipulation outcomes, the method participant may select the division operator, ignore the outcome of rolling or spinning the numeric token 40, and select a division token instead for evaluating. As the result of the division token may not be available to the method participant while the method participant must select the mathematical operator, an additional element of risk is introduced to the method.

The scope of the monopoly desired for the invention is defined by the claims appended hereto, with the foregoing description being merely illustrative of the preferred embodiments of the invention. Persons of ordinary skill may envisage modifications to the described embodiment which, although not explicitly suggested herein, do not depart from the scope of the invention, as defined by the appended claims.

The invention claimed is:

1. A game to be played by at least one game player, the game comprising:
    an array of numeric panels, each including a numeric indicia associated with a numerical value, each of the numeric panels having an available position and an unavailable position, and the numeric panels being changeable from the available position to the unavailable position in response to manipulation by the at least one game player;
    at least two numerical tokens, each comprising a plurality of numerical indicia, the at least two numerical tokens being actuatable by the at least one game player, wherein each numerical token is randomly associated with one of a plurality of numerical operands after the at least two numerical tokens are actuated;
    a mathematic operator token comprising a plurality of surfaces and a plurality of operator indicia, each of the plurality of surfaces being separated from each other, each operator indicia associated with one of a plurality of mathematical operators, one of the mathematical operators of the plurality of mathematical operators comprising a division operator, the mathematical operator token being actuatable by the at least one game player and each of the plurality of operator indicia being positioned on a different one of the plurality of surfaces such that one of the plurality of operator indicia is randomly shown to be selected and the remaining plurality of operator indicia are shown to not be selected in response to the actuation of the mathematical operator token; and
    wherein, after the division operator is randomly shown to be selected in response to the actuation of the mathematical operator token, a division operation is presented to the game player wherein the evaluation of the division operation results solely in an integer quotient.

2. The game of claim 1, further comprising:
    a division token comprising a plurality of cards, each card having a face displaying a division indicia, each division indicia associated with one of a plurality of predefined division operations, each of the predefined division operations evaluating solely to an integer quotient; and
    wherein one of the plurality of predefined division operation is presented to the game player when the division operator is randomly shown to be selected.

3. The game of claim 2, wherein the mathematic operator token is a die comprising a plurality of die sides, each one of the plurality of surfaces comprising a corresponding one of the plurality of die sides, the plurality of operator indicia further comprising an addition operator, a subtraction operator, and a multiplication operator, and
    a top-most die side of the plurality of die sides corresponds to the one of the plurality of operator indicia that is randomly shown to be selected after the die is rolled, and the plurality of die sides that are not the top-most die side correspond to the remaining plurality of operator indicia that are shown to be not selected after the die is rolled.

4. The game of claim 2, wherein the at least one game player further comprises at least two game players and the game further comprising a timer wherein upon expiry of the timer, a winner is determined from amongst the at least two game players.

5. The game of claim 2, wherein one of the plurality of operator indicia comprises a wild operator and wherein the at least one game player is permitted to select any one of the plurality of mathematical operators upon the selection of the wild operator.

6. The game of claim 2, wherein the array of numeric panels comprises at least two rows of numeric panels, each row including equivalently-numbered panels.

7. The game of claim 2, further comprising a pointer, and wherein the mathematic operator token is a wheel, each one of the plurality of surfaces being separated from each other by a marked line or beveled line of the wheel, the plurality of operator indicia further comprising an addition operator, a subtraction operator, and a multiplication operator,
    and wherein the pointer is positioned such that the pointer points to the one of the plurality of surfaces including the one of the plurality of operator indicia that is randomly shown to be selected after the wheel is spun, and is positioned such that the pointer does not point to the plurality of surfaces including the remaining plurality of operator indicia after the wheel is spun.

8. A method of playing a game, the method comprising:
    providing a mathematical operator token, the mathematical operator token being actuatable to randomly select a mathematical operator from a plurality of mathematical operators, the mathematical operator token comprising a plurality of operator indicia, each operator indicia associated with one of the plurality of mathematical operators, one of the mathematical operators of the plurality of mathematical operators comprising a division operator;
    providing at least two numerical tokens, each numerical token having a plurality of numerical operands, the at least two numerical tokens being actuatable to randomly select at least two numerical operands, each said numerical token comprising a plurality of numerical indicia, each numerical indicia associated with one of the plurality of numerical operands;
    providing an array of numeric panels, the numerical panels having available panels and unavailable panels, the available panels being manipulatable, the numerical panels including a subset of available panels, each panel of the array of numeric panels including a numeric indicia associated with a numeric value;
    actuating the mathematical operator token to randomly select the mathematical operator;
    evaluating an operation corresponding to the selected mathematical operator, wherein:
    (a) if the division operator is selected, evaluating a division operation provided from a plurality of predefined division operations, each of the division operations evaluating solely to an integer quotient, and
    (b) otherwise, actuating the at least two numerical tokens to randomly select the at least two numerical operands and evaluating the at least two numerical operands with the selected mathematical operation;
    manipulating a subset of available panels from the array of numeric panels, a sum of the numeric values of the manipulated subset being equal to an outcome of the evaluating, the manipulated subset of panels being subsequently unavailable for manipulating; and repeating the steps of actuating the mathematical operator token, evaluating the operation and manipulating the subset of available panels until a pre-defined termination state is achieved.

9. The method of claim 8, wherein when the division operator is selected, the step of randomly selecting the division operation further comprises randomly selecting a plurality of predefined division operations using a division token, the division token comprising a plurality of division indicia each associated with one of the predefined division operations.

10. The method of claim 8, wherein the pre-defined termination state comprises all of the numeric panels being unavailable for the manipulating.

11. The method of claim 8, further comprising manipulating none of the panels of the array of numeric panels when the outcome of the evaluating is incorrect.

12. The method of claim 8, wherein the pre-defined termination state comprises the manipulated subset of panels being none of the panels of the array of numeric panels.

13. The method of claim 8, further comprising the game being played by multiple game players simultaneously, the game being played within a predefined period of time, and determining a winner based on the sums of the numeric values of the panels of each of the multiple game players not manipulated when the pre-defined termination state is achieved.

14. The method of claim 8, wherein one of the operator indicia comprises a wild operator, and the step of actuating the mathematical operator token further comprises selecting one of the plurality of mathematical operators upon the selected mathematical operator comprising the wild operator.

15. The method of claim 8, wherein the array of numeric panels comprises at least two rows of the numeric panels, each row including equivalently-numbered panels.

16. The method of claim 8, wherein manipulating the subset of available panels further comprises obscuring the numeric indicia of each one of the numeric panels in the subset.

17. The method of claim 8, further comprising the game being played by multiple game players simultaneously wherein once the pre-defined termination state is achieved, game play continues by making available for manipulating each unavailable panel, each of the multiple game players repeatedly performing the steps of actuating the mathematical operator token, evaluating the operation, manipulating the subset of available panels and repeating those steps until a sum of the numeric values of the panels not manipulated by one of the multiple game players when the pre-defined termination state is achieved exceed a pre-determined maximum value.

18. The method of claim 8, wherein the mathematical operator token comprises a mathematical operator die comprising a plurality of die sides, each one of the plurality of operator indicia being represented on one of the plurality of die sides, the plurality of operator indicia further comprising an addition operator, a subtraction operator, and a multiplication operator.

19. The method of claim 8, wherein the at least one numerical token comprises a first set of at least two numerical token dice, and a second set of at least two numerical token dice and wherein the selected at least one numerical operand comprises a first numerical operand and a second numerical operand, the first numerical operand comprising a summation of the dice roll outcomes of the first set of at least two numerical token dice, and the second numerical operand comprising a summation of the dice roll outcomes of the second set of at least two numerical token dice.

20. The method of claim 8, wherein each one of the at least one numerical tokens comprises a numerical die comprising a plurality of sides, each side having thereon an indication of one of the plurality of numerical indicia.

\* \* \* \* \*